US012530041B2

(12) United States Patent
Lei

(10) Patent No.: US 12,530,041 B2
(45) Date of Patent: Jan. 20, 2026

(54) LINEAR REGULATOR AND VOLTAGE REGULATION METHOD FOR ADJUSTING OUTPUT VOLTAGE IN REAL TIME ACCORDING TO LOAD REQUIREMENT

(71) Applicant: Realtek Semiconductor Corporation, Hsinchu (TW)

(72) Inventor: Liang-Huan Lei, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 267 days.

(21) Appl. No.: 18/302,799

(22) Filed: Apr. 19, 2023

(65) Prior Publication Data

US 2023/0376062 A1 Nov. 23, 2023

(30) Foreign Application Priority Data

May 18, 2022 (TW) ................................ 111118584

(51) Int. Cl.
*G05F 1/575* (2006.01)
*G05F 1/565* (2006.01)
*G05F 1/59* (2006.01)

(52) U.S. Cl.
CPC .............. *G05F 1/575* (2013.01); *G05F 1/565* (2013.01); *G05F 1/59* (2013.01)

(58) Field of Classification Search
CPC ............. G05F 1/565; G05F 1/575; G05F 1/59
See application file for complete search history.

(56) References Cited

U.S. PATENT DOCUMENTS

| | | | | |
|---|---|---|---|---|
| 10,254,778 B1 * | 4/2019 | Sambucco | .............. | G05F 1/565 |
| 2017/0160757 A1 * | 6/2017 | Yang | ...................... | G05F 1/575 |
| 2019/0025861 A1 * | 1/2019 | Hung | ...................... | G05F 1/465 |
| 2021/0389790 A1 * | 12/2021 | Raducan | ................ | G05F 1/575 |
| 2023/0137946 A1 * | 5/2023 | Chinthu | ................. | G05F 1/569 323/282 |

FOREIGN PATENT DOCUMENTS

CN 108491020 A 9/2018

* cited by examiner

*Primary Examiner* — Monica Lewis
*Assistant Examiner* — Lakaisha Jackson
(74) *Attorney, Agent, or Firm* — CKC & Partners Co., LLC

(57) ABSTRACT

A linear regulator includes a switching element, an error amplifier circuit, a feedback circuit and a triggering element. A first terminal of the switching element receives an input voltage, and outputs an output voltage to a load through a second terminal. A first input terminal of the error amplifier circuit receives a reference voltage, and an output terminal of the error amplifier circuit is electrically connected to a control terminal of the switching element. The feedback circuit is electrically connected between the second terminal and a second input terminal of the error amplifier circuit. The trigger element is electrically connected to the control terminal and the load to receive a trigger signal. The trigger element outputs a trigger voltage to the control terminal according to the trigger signal, and the switch element is configured to change the output voltage.

13 Claims, 2 Drawing Sheets

100

LINEAR REGULATOR AND VOLTAGE REGULATION METHOD FOR ADJUSTING OUTPUT VOLTAGE IN REAL TIME ACCORDING TO LOAD REQUIREMENT

CROSS-REFERENCE TO RELATED APPLICATION

This application claims priority to Taiwan Application Serial Number 111118584, filed May 18, 2022, which is herein incorporated by reference in its entirety.

BACKGROUND

Technical Field

The present disclosure relates to a technology for outputting a corresponding voltage to a load according to requirement, especially a linear voltage regulator and a voltage regulator method.

Description of Related Art

Linear regulator (LDO) is a device used to maintain voltage stability. The linear regulator can be applied to power supply to provide the output voltage to a load. However, if the power requirement of the load increases suddenly, the linear regulator will not be able to respond quickly, so that the voltage of the output terminal of the linear regulator will drop rapidly, which affects the voltage stability. In view of this, it is necessary to provide a linear regulator that can be adjusted in real time according to the requirements of the load.

SUMMARY

One aspect of the present disclosure is a linear regulator, comprising a switching element, an error amplifier circuit, a feedback circuit and a triggering element. The switching element comprises a first terminal, a second terminal and a control terminal. The switching element is configured to receive an input voltage through the first terminal, and is configured to output an output voltage to a load through the second terminal. The error amplifier circuit comprises a first input terminal, a second input terminal and an output terminal. The first input terminal is configured to receive a reference voltage, and the output terminal is coupled to the control terminal. The feedback circuit is coupled between the second terminal of the switching element and the second input terminal of the error amplifier circuit. The triggering element is coupled between the control terminal and the load, and is configured to receive a trigger signal from the load. The triggering element is configured to output a trigger voltage to the control terminal according to the trigger signal, and the switch element is configured to change the output voltage according to the trigger voltage.

Another aspect of the present disclosure is a voltage regulation method, comprising: receiving, by a first terminal of a switching element, an input voltage, and outputting, by a second terminal of the switching element, an output voltage to a load; transmitting, by feedback circuit, a feedback voltage to an error amplifier circuit according to the output voltage; comparing, by the error amplifier circuit, a reference voltage with the feedback voltage to control a voltage on a control terminal of the switching element; receiving, by a triggering element, a trigger signal to generate a trigger voltage on the control terminal, wherein the trigger signal is configured to control the load to drive a circuit in the load; and changing the output voltage according to the trigger voltage.

Another aspect of the present disclosure is a linear regulator, comprising a control circuit, a switching element, an error amplifier circuit, a feedback circuit and a triggering element. The control circuit is configured to provide a trigger signal to a load to drive a circuit in the load. The switching element comprises a first terminal, a second terminal and a control terminal. The switching element is configured to receive an input voltage through the first terminal, and is configured to output an output voltage to a load through the second terminal. The error amplifier circuit comprises a first input terminal, a second input terminal and an output terminal. The first input terminal is configured to receive a reference voltage, and the output terminal is coupled to the control terminal. The feedback circuit is coupled between the second terminal of the switching element and the second input terminal of the error amplifier circuit. The triggering element is coupled between the control terminal and the load, and is configured to receive a trigger signal from the load. The triggering element is configured to output a trigger voltage to the control terminal according to the trigger signal, and the switch element is configured to change the output voltage according to the trigger voltage.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

It will be understood that when an element is referred to as being "connected to" or "coupled to", it can be directly connected or coupled to the other element or intervening elements may be present. In contrast, when an element to another element is referred to as being "directly connected" or "directly coupled," there are no intervening elements present. As used herein, the term "and/or" includes an associated listed items or any and all combinations of more.

Figure 1:
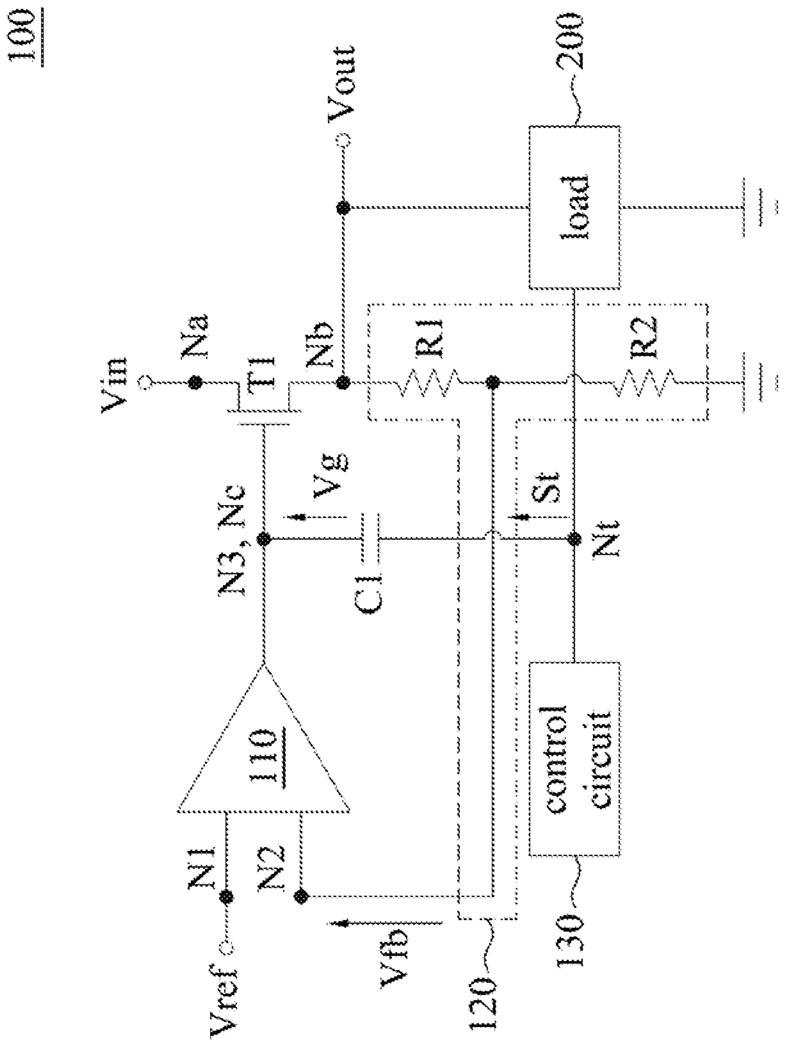
FIG. 1 is a schematic diagram of a linear regulator in some embodiments of the present disclosure.

FIG. 1 is a schematic diagram of a linear regulator 100 in some embodiments of the present disclosure. The linear regulator 100 includes a switching element T1, an error amplifier circuit 110, a feedback circuit 120 and a triggering element C1. The switching element T1 includes a first terminal Na, a second terminal Nb and a control terminal Nc. The first terminal Na is coupled to an input voltage Vin, so that the switching element T1 receives an input voltage Vin by the first terminal Na. The switching element T1 generates an output voltage Vout according to the input voltage Vin and the voltage on the control terminal Nc, and provides the output voltage to a load 200 through the second terminal Nb.

In some embodiments, the switching element T1 is implemented by an N-type metal oxide semiconductor field effect transistor (NMOS), but the switching element T1 is not limited to this. The switching element T1 can also be implemented by multiple NMOSs connected to each other. In addition, in some other embodiments, the switching element T1 can be implemented by a P-type metal oxide semiconductor field effect transistor (PMOS), a bipolar junction transistor (BJT), a thin film transistor (TFT) or other different types of the switching element. Since one skilled in the art can understand the manner in which the switching element T1 generates the output voltage Vout according to the input voltage Vin, it will not be repeated here.

The error amplifier circuit 110 includes a first input terminal N1, a second input terminal N2 and an output terminal N3. In some embodiments, the error amplifier circuit 110 can be implemented by an operational amplifier. The first input terminal N1 is coupled to the reference voltage Vref. The second input terminal N2 is coupled to the second terminal Nb of the switching element T1. The output terminal N3 is coupled to the control terminal Nc of the switching element T1.

The feedback circuit 120 is coupled between the second terminal Nb of the switching element T1 and the second input terminal N2 of the error amplifier circuit 110. The feedback circuit 120 is configured to transmit a feedback voltage Vfb to the error amplifier circuit 110 according to the output voltage Vout. In some embodiments, the error amplifier circuit 110 is configured to compare a reference voltage Vref and the feedback voltage Vfb, and amplifies the difference between the reference voltage Vref and the feedback voltage Vfb to output a corresponding voltage to the control terminal Nc, for example, provides the amplified difference to the control terminal Nc.

Specifically, in one embodiment, the feedback circuit 120 includes a first resistor R1 and a second resistor R2. The first resistor R1 is coupled to the second terminal Nb of the switching element T1, the second resistor R2 is coupled to the first resistor R1, the second input terminal N2 and another reference voltage (e.g., ground shown in the figure). In other words, the second input terminal N2 of the error amplifier circuit 110 is coupled between the first resistor R1 and the second resistor R2. Therefore, the feedback circuit 120 divides the output voltage Vout according to the impedance value of the first resistor R1 and the second resistor R2, so as to generate the feedback voltage Vfb.

In some embodiments, the impedance value of the feedback circuit is between 1000 and 3000 ohms. That is, the sum of the impedance value of the first resistor R1 and the second resistor R2 is 1000 to 3000 ohms (e.g., 2200 ohms). The impedance ratio of the first resistor R1 and the impedance ratio of the second resistor R2 can be adjusted according to design requirements, and it will not be repeated here.

In general, if the voltage or current required by the load 200 does not change, the feedback voltage Vfb provided by the feedback circuit 120 to the error amplifier circuit 110 is substantially the same as the reference voltage Vref. Therefore, the voltage value output by the error amplifier circuit 110 to the control terminal Nc is approximately the same, and the output voltage Vout output by the switching element T1 also maintains stable.

Relatively, if the voltage or current required by the load 200 changes suddenly in a short period of time (e.g., the current of the load requirement is increased instantaneously), the voltage value output by the error amplifier circuit 110 to the control terminal Nc will increase accordingly. The output voltage Vout output by the switching element T1 will increase correspondingly in response to the increase in the voltage of the control terminal, so as to ensure that the voltage on the second terminal Nb of the switching element T1 will not drop rapidly when supplying a large current to the load 200.

The triggering element C1 is coupled between the control terminal Nc of the switching element T1 and the load 200. In this embodiment, the triggering element C1 includes a capacitor, and receives a trigger signal St. from the load 200. The trigger signal St is a signal used to control the load 200 to drive a specific circuit (or a specific module) in the load 200, or is a signal generated when a specific circuit (or a specific module) in the load 200 is driven. When the specific circuit is driven, the power requirement of the load 200 will change, and the load 200 will obtain the corresponding changed power from the linear regulator 100 (e.g. higher current requirement).

In other embodiments, the trigger signal St can be generated by the linear regulator 100. As shown in FIG. 1, the linear regulator 100 includes a control circuit 130 for providing the trigger signal St to the load 200. The control circuit 130 can be a central processing unit (CPU), a system on chip (SoC), an application processor, an audio processor, a digital signal processor, or a specific function of processing chip or controller.

The triggering element C1 is coupled between the control terminal Nc and the trigger terminal Nt. In some embodiments, the trigger terminal Nt may only coupled to the load 200. In some other embodiments, the trigger terminal Nt is coupled to the load 200 and the control circuit 130, so as to receive the trigger signal St from the load 200 or the control circuit 130 according to different situations.

After receiving the trigger signal St, the triggering element C1 outputs the trigger voltage Vg to the control terminal Nc according to the trigger signal St. At this time, the switching element T1 changes the output voltage Vout supplied to the load 200 according to the voltage of the control terminal Nc (i.e., the trigger voltage Vg). In one embodiment, the triggering element C1 comprises a capacitor, and the trigger signal St is a type of pulse control signal. Since the capacitor tends to maintain the voltage difference between its two ends (i.e., capacitive coupling), when the voltage at one end of the triggering element C1 changes due to the pulse control signal of the trigger signal St, the voltage at the other end of the triggering element C1 will change accordingly, thereby generating the trigger voltage Vg at the control terminal Nc.

In some embodiments, the trigger voltage Vg is configured to increase the voltage of the control terminal Nc, and the switching element T1 is configured to increase the output voltage Vout according to the trigger voltage Vg. Specifically, when the power requirement of the load 200 suddenly increases (e.g., the load suddenly changes from a light load to a heavy load), the load 200 draws a large current from the second terminal Nb. At this time, the feedback circuit 120 may not be able to quickly transmit the voltage change (the output voltage Vout) of the second terminal Nb to the error amplifier circuit 110. That is, the error amplifier circuit 110 may not be able to adjust the voltage of the second terminal Nb correspondingly in real time. Therefore, by detecting the trigger signal St through the triggering element C1, the voltage change will be quickly transmitted to the second terminal Nb, so that the switching element T1 changes the output voltage Vout in real time.

Figure 2:
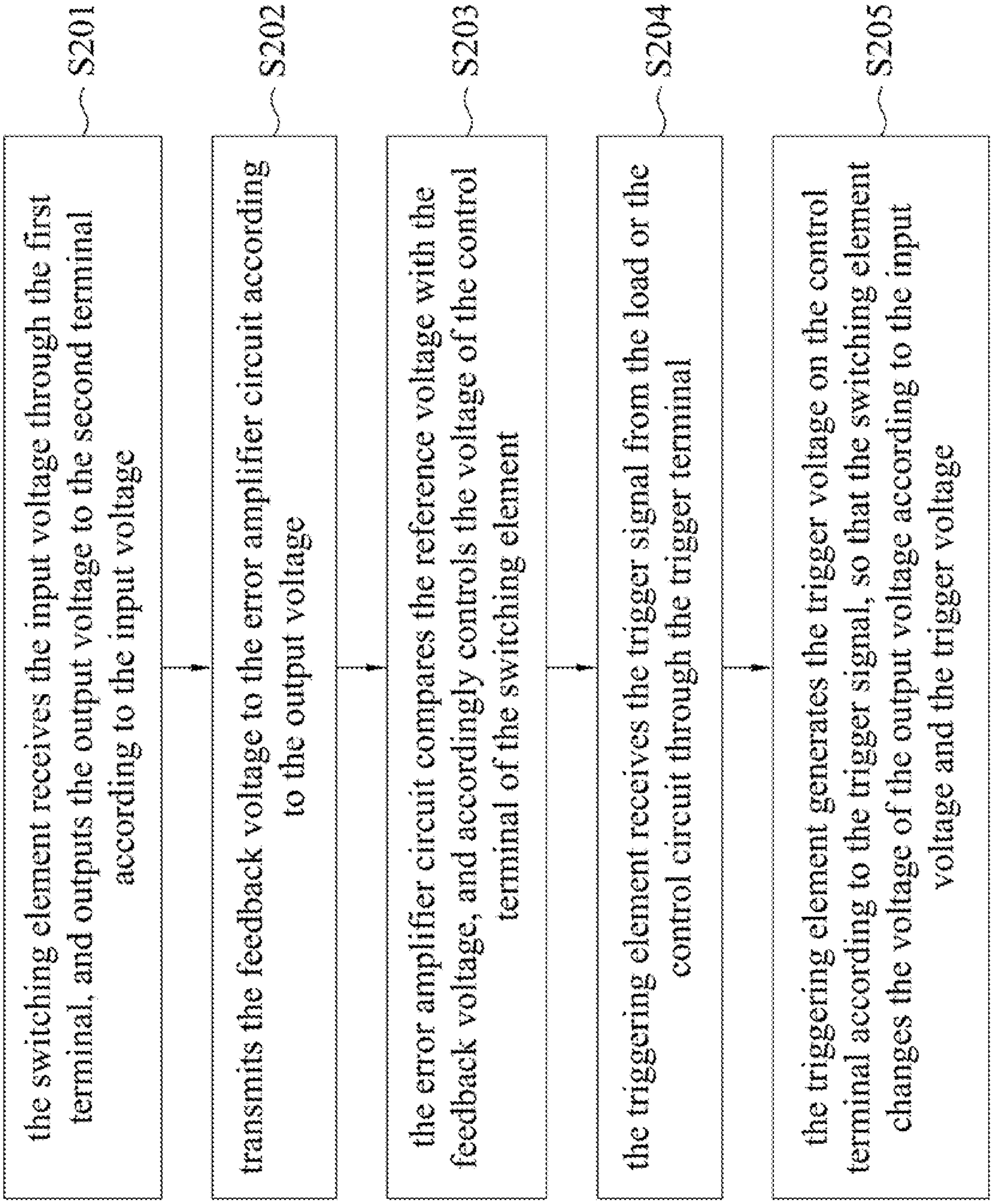
FIG. 2 is a flowchart illustrating a voltage regulation method in some embodiments of the present disclosure.

FIG. 2 is a flowchart illustrating a voltage regulation method in some embodiments of the present disclosure. In step S201, the switching element T1 receives the input voltage Vin through the first terminal Na, and outputs the output voltage Vout to the second terminal Nb according to the input voltage Vin.

In step S202, the feedback circuit 120 transmits the feedback voltage Vfb to the error amplifier circuit 110 according to the output voltage Vout. In step S203, the error amplifier circuit 110 compares the reference voltage Vref with the feedback voltage Vfb, and accordingly controls the voltage of the control terminal Nc of the switching element T1.

In step S204, when the load 200 is about to be activated, or the load 200 is to drive a specific circuit or a specific module inside, the load 200 executes an action (i.e., executes step S204) according to the trigger signal St, or generates the trigger signal St before executing the action. At this time, the triggering element C1 receives the trigger signal St (e.g., pulse signal) from the load 200 or the control circuit 130 through the trigger terminal Nt.

In step S205, the triggering element C1 generates the trigger voltage Vg on the control terminal Nc according to the trigger signal St, so that the switching element T1 changes the voltage of the output voltage Vout according to the input voltage Vin and the trigger voltage Vg (i.e., the voltage of the control terminal Nc at this time).

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:

1. A linear regulator, comprising:

a switching element comprising a first terminal, a second terminal and a control terminal, wherein the switching element is configured to receive an input voltage through the first terminal, and is configured to output an output voltage to a load through the second terminal;

an error amplifier circuit comprising a first input terminal, a second input terminal and an output terminal, wherein the first input terminal is configured to receive a reference voltage, and the output terminal is coupled to the control terminal;

a feedback circuit coupled between the second terminal of the switching element and the second input terminal of the error amplifier circuit; and a triggering element coupled between the control terminal and the load, and is configured to receive a trigger signal from the load, wherein the triggering element is configured to output a trigger voltage to the control terminal according to the trigger signal, and the switch element is configured to change the output voltage according to the trigger voltage, wherein the triggering element comprises a capacitor, a first terminal of the capacitor is directly connected to the load to receive the trigger signal, and a second terminal of the capacitor is directly connected to the control terminal.

2. The linear regulator of claim 1, wherein the trigger voltage is configured to increase a voltage of the control terminal, and the switch element is configured to increase the output voltage according to the trigger voltage.

3. The linear regulator of claim 2, wherein the trigger signal is a type of pulse control signal.

4. The linear regulator of claim 1, wherein the feedback circuit comprises a first resistor and a second resistor, the second input terminal of the error amplifier circuit is coupled between the first resistor and the second resistor, and an impedance value of the feedback circuit is between 1000 and 3000 ohms.

5. A voltage regulation method, comprising:

receiving, by a first terminal of a switching element, an input voltage, and outputting, by a second terminal of the switching element, an output voltage to a load;

transmitting, by feedback circuit, a feedback voltage to an error amplifier circuit according to the output voltage;

comparing, by the error amplifier circuit, a reference voltage with the feedback voltage to control a voltage on a control terminal of the switching element;

receiving, by a triggering element, a trigger signal to generate a trigger voltage of the control terminal, wherein the trigger signal is configured to control the load to drive a circuit in the load; and changing the output voltage according to the trigger voltage, wherein the triggering element comprises a capacitor, a first terminal of the capacitor is directly connected to the load to receive the trigger signal, and a second terminal of the capacitor is directly connected to the control terminal.

6. The voltage regulation method of claim 5, wherein the trigger voltage is configured to increase the voltage of the control terminal, and the voltage regulation method further comprises:

increasing, by the switch element, the output voltage according to the trigger voltage.

7. The voltage regulation method of claim 6, wherein the trigger signal is a type of pulse control signal.

8. The voltage regulation method of claim 5, wherein the triggering element receives the trigger signal by the load or a control circuit.

9. A linear regulator, comprising:

a control circuit configured to provide a trigger signal to a load to drive a circuit in the load;

a switching element comprising a first terminal, a second terminal and a control terminal, wherein the switching element is configured to receive an input voltage through the first terminal, and is configured to output an output voltage to the load through the second terminal;

an error amplifier circuit comprising a first input terminal, a second input terminal and an output terminal, wherein the first input terminal is configured to receive a reference voltage, and the output terminal is coupled to the control terminal;

a feedback circuit coupled between the second terminal of the switching element and the second input terminal of the error amplifier circuit; and a triggering element coupled between the control terminal and the load, and is configured to receive the trigger signal from the control circuit, wherein the triggering element is configured to output a trigger voltage to the control terminal according to the trigger signal, and the switch element is configured to change the output voltage according to the trigger voltage.

10. The linear regulator of claim 9, wherein the triggering element comprises a capacitor.

11. The linear regulator of claim 9, wherein the trigger voltage is configured to increase a voltage of the control terminal, and the switch element is configured to increase the output voltage according to the trigger voltage.

12. The linear regulator of claim 11, wherein the trigger signal is a type of pulse control signal.

13. The linear regulator of claim 9, wherein the feedback circuit comprises a first resistor and a second resistor, the second input terminal of the error amplifier circuit is coupled between the first resistor and the second resistor, and an impedance value of the feedback circuit is between 1000 and 3000 ohms.

* * * * *